July 28, 1931. I. I. SIKORSKY 1,816,129
AIRCRAFT ESPECIALLY OF THE AMPHIBIAN TYPE INCLUDING
MEANS FOR MOUNTING ENGINES THEREON
Original Filed June 7, 1929  4 Sheets-Sheet 1

Igor I. Sikorsky
INVENTOR
BY
ATTORNEY

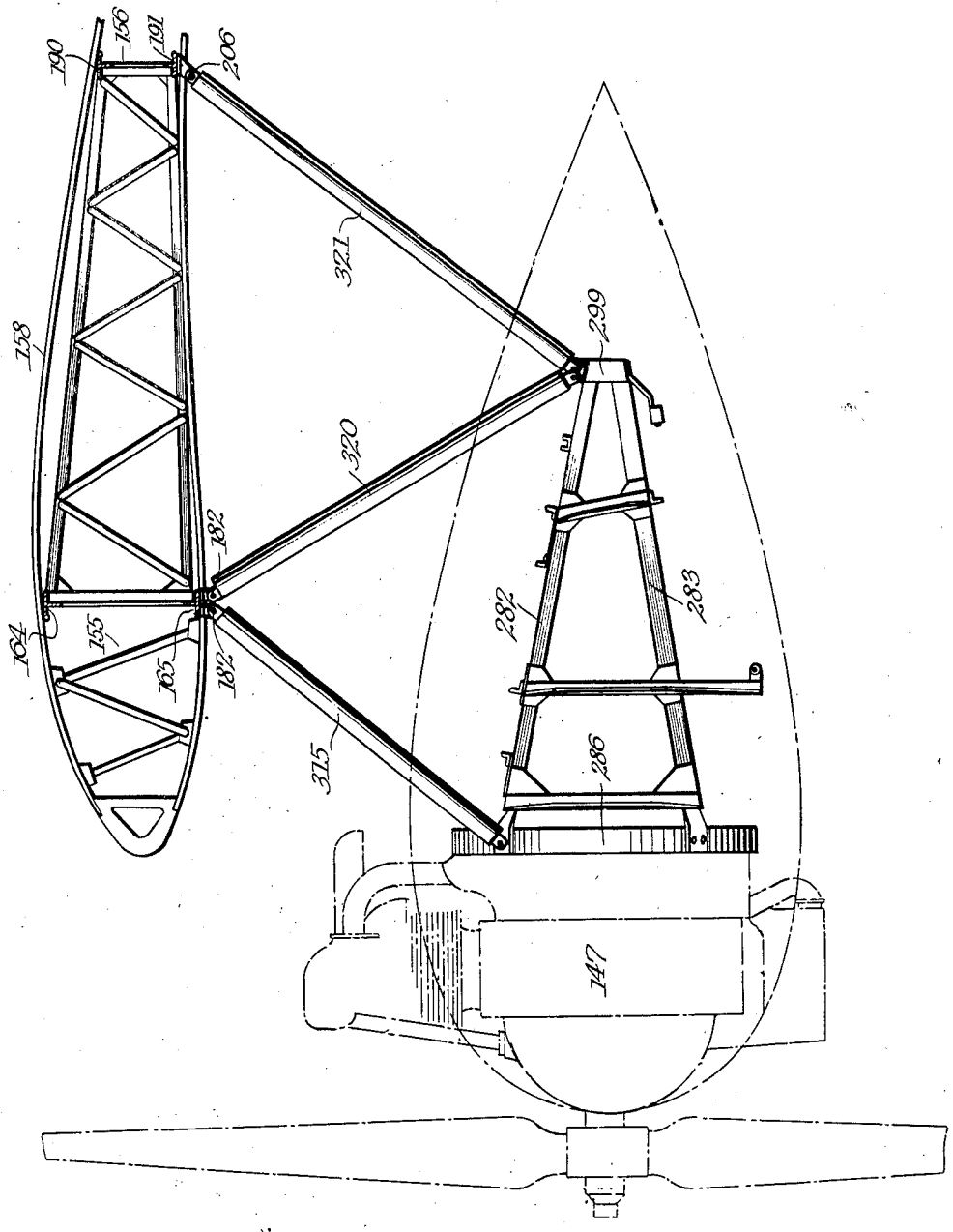

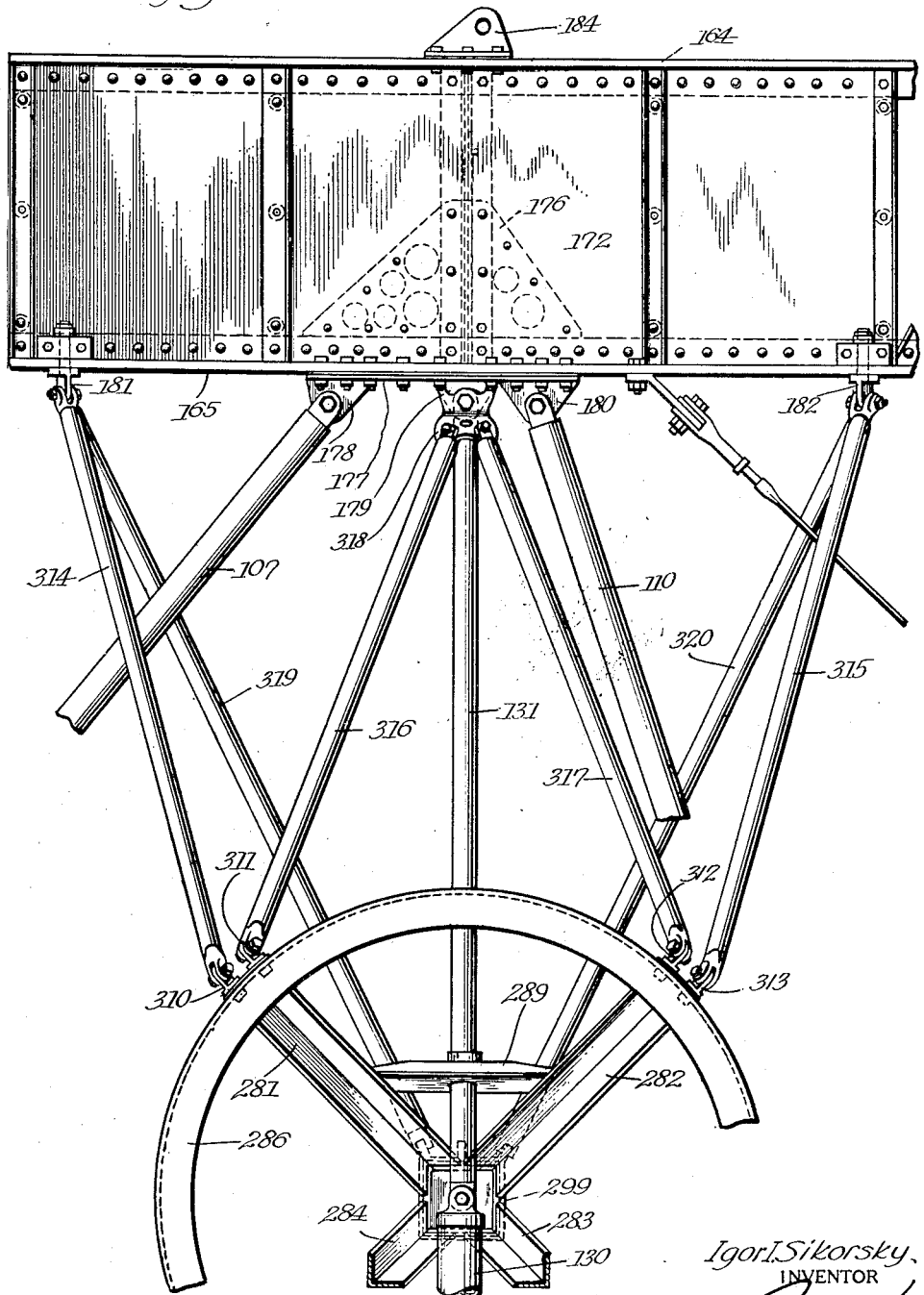

July 28, 1931.  I. I. SIKORSKY  1,816,129
AIRCRAFT ESPECIALLY OF THE AMPHIBIAN TYPE INCLUDING
MEANS FOR MOUNTING ENGINES THEREON
Original Filed June 7, 1929  4 Sheets-Sheet 4
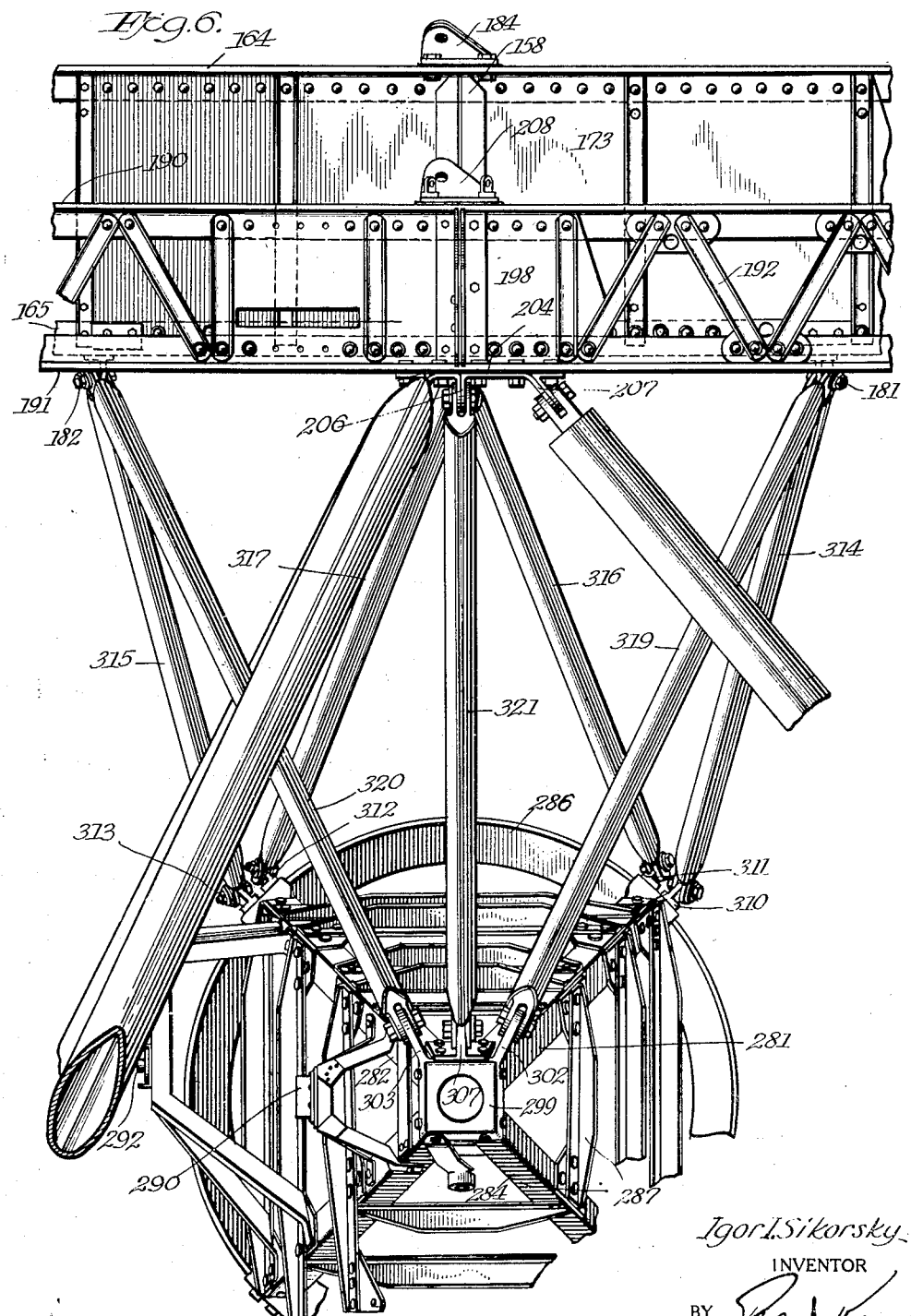

Patented July 28, 1931

1,816,129

UNITED STATES PATENT OFFICE

IGOR I. SIKORSKY, OF COLLEGE POINT, NEW YORK, ASSIGNOR TO SIKORSKY AVIATION CORPORATION, OF WILMINGTON, DELAWARE, A CORPORATION OF DELAWARE

AIRCRAFT ESPECIALLY OF THE AMPHIBIAN TYPE INCLUDING MEANS FOR MOUNTING ENGINES THEREON

Original application filed June 7, 1929, Serial No. 369,113. Divided and this application filed August 12, 1929. Serial No. 385,218.

The subject matter of this application, which is a division of an earlier filed case, Serial No. 369,113, filed June 7, 1929, relates to improvements in amphibians, or aircraft of the amphibian type and particularly to means for supporting the motors or engines of such craft.

In the accompanying drawings:

Figure 4 is a vertical sectional view through the main plane showing the motor supporting means in elevation, the parts being on a somewhat enlarged scale.

Figure 5 is a front elevation of the motor suspension means and a portion of the main supporting plane structure, the latter being substantially on the line 5—5 of Figure 4 and the parts being on a very considerably enlarged scale.

Figure 6 is a rear elevation of the motor suspension means and portions of the supporting plane structure.

Figure 1:
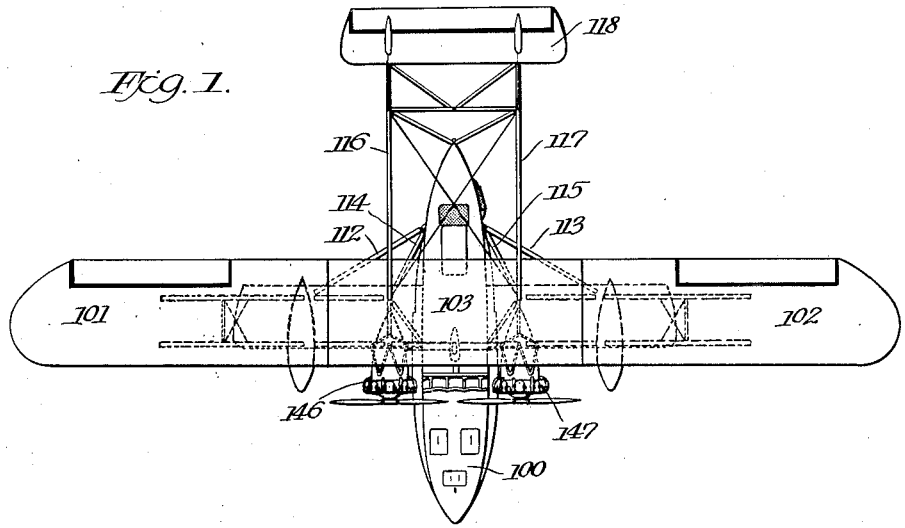
Figure 1 is a plan view of a multi-motor amphibian having an embodiment of the present invention applied thereto.

Referring to the drawings, in the several views of which corresponding parts are designated by the same reference character, the body-boat of the amphibian is designated 100 and shown as being supported beneath a main plane comprising right and left wings 101 and 102, respectively, and a center section 103.

Lower wings 104 and 105 project laterally from the body-boat beneath the upper or main plane, and the two sets of planes are interconnected and supported by a suitable truss structure preferably including two duplicate sets of struts 106, 107, 108 and 109.

In addition, the main plane and forward portion of the body-boat are connected by suitable struts, and other struts 112 and 113 connect the lower wings 104, 105, respectively, with the body-boat. Other struts 114, 115 are shown as being interposed between the wings of the main plane and the rear portion of the body-boat.

The particular amphibian illustrated, is provided with outriggers 116 and 117 which project rearwardly from the center section of the main plane, and at their rear ends support an empennage assembly designated as a whole by the reference character 118.

The amphibian illustrated is provided with two motors or engines 146, 147 which are supported by means that will be hereinafter more particularly described and which constitutes the invention of the present application.

Figure 2:
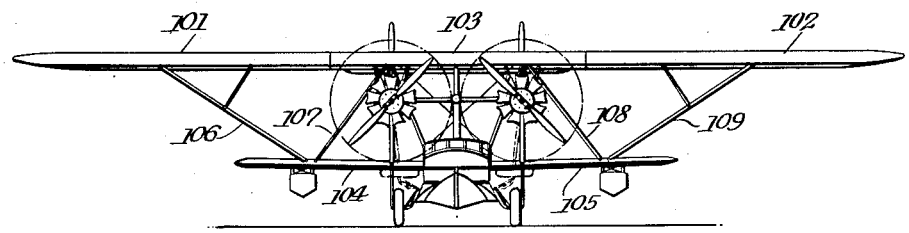
Figure 2 is a front elevation of the same.
Figure 3:
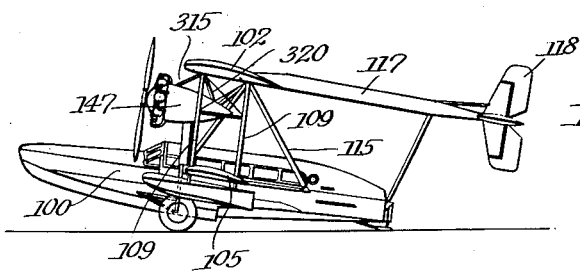
Figure 3 is a side elevation.

As shown in Figures 1 to 3, the two engines 146, 147 are disposed symmetrically at opposite sides of the body-boat 100 and so arranged that they project forward beyond the front edge of the main plane.

The center section 103 of the main plane from which the engines are suspended includes, as shown particularly in Figure 4, front and rear spars 155, 156 which are connected by suitable compression members 158.

The front spar comprises two vertically spaced angle iron members 164, 165, which are connected by suitable truss members and further reinforced above each engine supporting frame by vertically extending plates 172, 173, securely riveted to opposite faces of the vertically extending webs of the top and bottom members 164, 165.

Further, the lower portion of the front spar, as shown in Figure 5, is reinforced by plates 176.

Similarly, the rear spar is formed of vertically spaced angle iron members 190, 191 connected by diagonally extending truss members 192, and also reinforced above each engine support by vertically positioned plates 198, which are riveted to the vertically extending members of the top and bottom bars 190, 191.

It will be understood that each of the spars is reinforced, as above described, at points above each engine support, although only one of such reinforced portions and engine supporting means are illustrated in the drawings.

As shown, the front and rear spars are provided with apertured cable attachment lugs 184 and 208 to which cables may be attached when the machine is to be hoisted manually or by externally applied power.

Each engine supporting frame comprises a ring-like member 286 adapted to be firmly secured to a motor, and an elongated frame that projects rearwardly from said ring below the front spar of the main plane. As shown, this rearwardly extending, elongated, frame is of skeleton pyramidal form, including four corner members of angle iron 281, 282, 283 and 284 connected at their forward ends to the ring 286 and at their rear, converging, ends by a box-like member 299.

The ring 286 is in the nature of a single flanged forging, or may be formed of an L-shaped bar bent into a circle and having its abutting ends welded together. It is adapted to have a radial motor bolted directly thereto, or it may serve as a support for a rotary motor.

The engine supporting frame, referred to, is suspended from and connected with the aforesaid reinforced portions of both the front and rear spars of the mid-section of the main plane by means which will now be particularly described.

The ring 286 at the forward end of the engine supporting frame is provided with four radially projecting eye-bolts 310, 311, 312 and 313. To the bolts 310 and 313 are connected the lower ends of struts 314 and 315, the upper ends of which are connected to eye-bolts 181, 182 depending from the lower member 165 of the front spar of the center section of the main plane.

The eye bolts 311 and 312, which are spaced circumferentially of the ring 286 between the bolts 310, 313, are connected to the lower ends of struts 316 and 317, the upper ends of which are secured to a plate 318 that is bolted to a tongue 179 depending from a plate 177 which is bolted or riveted to the lower face of the bottom angle bar 165 of the front spar of the center section of the main plane.

As shown in Figure 5, the connections of the struts 316 and 317 with the front spar of the main plane is intermediate of the points 181, 182 at which the struts 314 and 315 are connected to said spar, and the several struts connected to the ring 286 are thus arranged in an approximately W-shaped formation, providing a very secure connection between the forward end of the engine supporting frame and the said front spar of the main plane.

The lower member 165 of the front spar is provided at opposite sides of the lug 179 with depending ears 178, 180 to which are connected struts 107, 110 of the series of struts interposed between the main plane and the lower wings 104, 105.

Further, lugs 302 and 303 on the box 299 at the rear, reduced, end of the engine supporting frame are connected by trusses 319, 320, respectively, with the bolts 181, 182 on the front spar member.

Additionally, a lug 307 extending upward from the box 299 at the rear end of the engine supporting frame is connected by a strut 321 with an apertured lug 206 carried by a plate like member 204 which is suitably bolted or riveted to the lower member 191 of the rear spar of the center section of the main plane.

Said plate 204 is shown also as provided with an apertured ear or lug 207 to which one of the struts that are interposed between the main plane and the lower wings of the machine may be connected.

The corner members 281, 282 of the engine supporting frame are connected by a plate 289 having therein an aperture that serves as a guide for a rod 131 which is connected to a member 130, and forms part of the mechanism controlling movement of the ground wheels of the machine which, as it does not form any particular form of the invention hereinafter claimed, is not illustrated.

The engine supporting frame as shown in Figure 6 is also provided with laterally extending bushings 290 and 292 which are designed to support parts of the control mechanism of the machine not herein illustrated in detail.

It will be noted that both ends of the engine frame are connected directly to the front spar of the main plane and the parts, as before noted, are so related that the engine is disposed in advance of the main plane, and the supporting frame thereof extends both forward and rearward of the front spar member.

Having thus described my invention, what I claim as new is—

1. In an amphibian, a plane including front and rear spars, an elongated motor supporting frame carrying a circular member beneath said plane with its longitudinal axis parallel to the longitudinal axis of the aircraft, suspension members in the form of a V connecting one end of said frame with both of said spars, and a suspension member connecting the other end of said frame with one of said spars.

2. In an amphibian, a plane including front and rear spars, an elongated motor supporting frame carrying a circular member beneath said plane with its longitudinal axis parallel to the longitudinal axis of the aircraft, suspension members in the form of a V connecting one end of said frame with both of said spars, and a suspension member connecting the other end of said frame with the other of said spars.

3. In an amphibian, a plane including front and rear spars, an elongated motor supporting frame carrying a circular member beneath said plane and projecting forwardly and rearwardly of the front spar, suspension members forming a V connecting the rear end of said frame with the front spar, suspension members forming an inverted V connecting the front circular member of motor support frame with said front spar, and a suspension member connecting the rear end of said frame with the rear spar.

4. In an amphibian, a plane including front and rear spars, an elongated motor supporting frame carrying a circular member beneath said plane and projecting forwardly and rearwardly of the front spar, suspension members in V form connecting both ends of said frame with the front spar at points spaced along the latter, and a suspension member connecting the rear end of said frame with the rear spar.

5. In an amphibian, a plane including front and rear spars, an elongated motor supporting frame carrying a circular portion beneath said plane and projecting forwardly and rearwardly of the front spar, suspension members connecting spaced points on the front circular portion of said frame with a single point on one spar, a further suspension member connecting the front circular portion of said frame to the said spar at a point spaced from the first mentioned connection point thereon, and a suspension member connecting the rear end of said frame with the other spar.

6. In an amphibian, a plane including front and rear spars, an elongated motor supporting frame carrying a circular portion beneath said plane and projecting forwardly and rearwardly of the front spar, a plurality of suspension members connecting the front circular portion of said frame at spaced points thereon with the front spar at a single point thereon, a further suspension member connecting the front portion of said frame to the front spar at a point spaced from the first mentioned connection point thereon, and a suspension member connecting the rear end of said frame with said rear spar.

7. In an amphibian, a wing including front and rear spars, an elongated motor supporting frame carrying a circular portion beneath said plane and projecting forwardly and rearwardly of the front spar, a plurality of suspension members connecting the front portion of said frame at spaced points thereon with the front spar at a single point thereon, further suspension members connecting said front circular portion of the frame to the front spar at points spaced from the first mentioned connection point thereon, suspension members connecting the rear end of said frame with the front spar at spaced points thereon, and a suspension member connecting the rear end of said frame with said rear spar.

8. In an amphibian, a motor supporting frame member, a plane above said member, and suspension members arranged in substantially W-formation connecting said member with the plane structure.

9. In an amphibian, a motor supporting ring, a plane above said ring and including a front spar, suspension members connecting said ring at points circumferentially spaced thereon with said spar at spaced points on the latter, and suspension members connecting said ring at circumferentially spaced points with said spar at a point midway between the first mentioned connection points thereon.

Signed at College Point, Long Island, in the county of Queens and State of New York, this 24th day of June, A. D. 1929.

IGOR I. SIKORSKY.